United States Patent
Xu et al.

(10) Patent No.: US 9,918,219 B2
(45) Date of Patent: Mar. 13, 2018

(54) CALL MANAGEMENT METHOD AND APPARATUS FOR MULTI-SIM MULTI-ACTIVE TERMINAL

(71) Applicant: HUAWEI DEVICE (DONGGUAN) CO., LTD., Dongguan (CN)

(72) Inventors: Zixiang Xu, Beijing (CN); Guangyuan Gao, Beijing (CN)

(73) Assignee: HUAWEI DEVICE (DONGGUAN) CO., LTD., Dongguan (CN)

(*) Notice: Subject to any disclaimer, the term of this patent is extended or adjusted under 35 U.S.C. 154(b) by 0 days.

(21) Appl. No.: 14/962,839

(22) Filed: Dec. 8, 2015

(65) Prior Publication Data

US 2016/0094982 A1 Mar. 31, 2016

Related U.S. Application Data

(63) Continuation of application No. PCT/CN2014/073103, filed on Mar. 10, 2014.

(30) Foreign Application Priority Data

Aug. 15, 2013 (CN) .......................... 2013 1 0356542

(51) Int. Cl.
*H04W 8/18* (2009.01)
*H04W 4/16* (2009.01)
*H04W 88/06* (2009.01)

(52) U.S. Cl.
CPC ............. *H04W 8/183* (2013.01); *H04W 4/16* (2013.01); *H04W 88/06* (2013.01)

(58) Field of Classification Search
CPC .... H04W 4/16; H04W 52/0287; H04W 8/183
See application file for complete search history.

(56) References Cited

U.S. PATENT DOCUMENTS

2002/0154632 A1* 10/2002 Wang .................... H04W 48/18
370/389
2009/0129296 A1 5/2009 Grinshpun et al.
(Continued)

FOREIGN PATENT DOCUMENTS

CN 001585533 A 2/2005
CN 1604661 A 4/2005
(Continued)

OTHER PUBLICATIONS

Foreign Communication From a Counterpart Application, Chinese Application No. 201310356542.8, Chinese Notice of Allowance dated May 31, 2016, 4 pages.
(Continued)

*Primary Examiner* — Myron K Wyche
(74) *Attorney, Agent, or Firm* — Conley Rose, P.C.

(57) ABSTRACT

A call management method for a multi-subscriber identity module (SIM) multi-active terminal, where multiple user cards register with a centralized call management module of the multi-SIM multi-active terminal. The method includes, when a first user card is used for making a call or receiving a call, determining call statuses of the multiple user cards according to a connection list in the centralized call management module, where the connection list is used to record connection data of the multiple user cards; and when a second user card is in a conversation state, setting the first user card to a waiting state; or setting the first user card to a conversation state, and setting the second user card to a waiting state; or simultaneously setting the first user card and the second user card to a conversation state, to implement a conference call.

19 Claims, 8 Drawing Sheets

(56) References Cited

U.S. PATENT DOCUMENTS

| | | | |
|---|---|---|---|
| 2009/0186607 A1 | 7/2009 | Kim | |
| 2012/0135715 A1* | 5/2012 | Kang | H04W 8/183 455/412.1 |
| 2014/0038569 A1* | 2/2014 | Chin | H04W 4/16 455/414.1 |
| 2014/0080459 A1* | 3/2014 | Taha | H04W 52/0287 455/414.1 |

FOREIGN PATENT DOCUMENTS

| | | | |
|---|---|---|---|
| CN | 1960550 | A | 5/2007 |
| CN | 101052187 | A | 10/2007 |
| CN | 101489322 | A | 7/2009 |
| CN | 101835103 | A | 9/2010 |
| CN | 101868955 | A | 10/2010 |
| CN | 101909263 | A | 12/2010 |
| CN | 101980579 | A | 2/2011 |
| CN | 102461326 | A | 5/2012 |
| CN | 102546993 | A | 7/2012 |
| CN | 103167455 | A | 6/2013 |
| CN | 103458136 | A | 12/2013 |

OTHER PUBLICATIONS

Partial English Translation and Abstract of Chinese Patent Application No. CN001604661, Dec. 10, 2015, 4 pages.
Partial English Translation and Abstract of Chinese Patent Application No. CN001960550, Dec. 10, 2015, 5 pages.
Partial English Translation and Abstract of Chinese Patent Application No. CN101052187, Dec. 10, 2015, 3 pages.
Partial English Translation and Abstract of Chinese Patent Application No. CN103458136, Dec. 9, 2015, 4 pages.
Partial English Translation and Abstract of Chinese Patent Application No. CN101835103, Nov. 18, 2015, 6 pages.
Partial English Translation and Abstract of Chinese Patent Application No. CN101909263, Nov. 18, 2015, 6 pages.
Partial English Translation and Abstract of Chinese Patent Application No. CN101980579, Nov. 18, 2015, 5 pages.
Partial English Translation and Abstract of Chinese Patent Application No. CN102546993, Nov. 18, 2015, 10 pages.
Partial English Translation and Abstract of Chinese Patent Application No. CN103167455, Nov. 18, 2015, 7 pages.
Foreign Communication From a Counterpart Application, Chinese Application No. 201310356542.8, Chinese Office Action dated May 15, 2015, 7 pages.
Foreign Communication From a Counterpart Application, PCT Application No. PCT/CN2014/073103, English Translation of International Search Report dated Jun. 11, 2014, 2 pages.
Foreign Communication From a Counterpart Application, PCT Application No. PCT/CN2014/073103, English Translation of Written Opinion dated Jun. 11, 2014, 12 pages.

* cited by examiner

CALL MANAGEMENT METHOD AND APPARATUS FOR MULTI-SIM MULTI-ACTIVE TERMINAL

CROSS-REFERENCE TO RELATED APPLICATIONS

This application is a continuation of International Application No. PCT/CN2014/073103, filed on Mar. 10, 2014, which claims priority to Chinese Patent Application No. 201310356542.8, filed on Aug. 15, 2013, both of which are hereby incorporated by reference in their entireties.

TECHNICAL FIELD

The present disclosure relates to the field of communications technologies, and in particular, to a call management method and apparatus for a multi-subscriber identity module (SIM) multi-active terminal.

BACKGROUND

At present, there are mainly two solutions for multi-SIM terminals on the market: multi-SIM multi-standby and multi-SIM multi-active. The former uses one baseband chip, one radio frequency chip, and one memory that form one system, and controls, by using software, the chips to constantly switch between multiple networks, so as to simultaneously search for and camp on networks used by multiple user cards, for example, networks used by a SIM card, a universal subscriber identity module (USIM) card, and a user identity module (UIM) cards, while the latter simultaneously uses multiple systems each including one baseband chip, one radio frequency chip, and one memory system, and is equivalent to combining multiple complete terminal mainboards in one terminal. When one user card is in a conversation state, another user card of a multi-SIM multi-standby terminal inevitably drops from a network, while another user card of a multi-SIM multi-active terminal can still be connected by dialing. Therefore, the multi-SIM multi-active terminal will inevitably become a mainstream on the market.

According to the prior art, as shown in FIG. 1, at present, call management links, which start from a user card 1 to a user card N at the bottom, pass through a wireless interface module 1 to a wireless interface module N respectively and a call management module 1 to a call management module N respectively, and reach an uppermost application 0, of a multi-SIM multi-active terminal are multiple entirely independent control paths that are unrelated to each other, and it may be considered that multiple independent terminals are merely integrated together by the uppermost application by force for displaying. In addition, in the prior art, a network side performs call management for multiple user cards served by a same network.

Therefore, the prior art has the following disadvantages. The network side cannot learn a call status of a user card that uses another network, and cannot perform centralized call management for multiple user cards served by different networks; therefore, the multiple user cards served by different networks cannot implement a conference call.

SUMMARY

In view of this, the present embodiments of the disclosure provide a call management method and apparatus for a multi-SIM multi-active terminal, which can perform centralized call management for multiple user cards served by different networks, so that the multiple user cards served by different networks can implement a conference call.

According to a first aspect, the present embodiment of the disclosure provides a call management method for a multi-SIM multi-active terminal, where multiple user cards are installed in the multi-SIM multi-active terminal, where the multiple user cards register with a centralized call management module of the multi-SIM multi-active terminal, and the call management method includes, when a first user card is used for making a call or receiving a call, determining, by the multi-SIM multi-active terminal, call statuses of the multiple user cards according to a connection list in the centralized call management module, where the connection list is used to record connection data of the multiple user cards; and when a second user card is in a conversation state, setting, by the multi-SIM multi-active terminal, the first user card to a waiting state; or setting the first user card to a conversation state, and setting the second user card to a waiting state; or simultaneously setting the first user card and the second user card to a conversation state, to implement a conference call, where the first user card is at least one user card of the multiple user cards, and the second user card is at least one user card of the multiple user cards except the first user card.

In a first possible implementation manner of the first aspect, the setting the first user card to a waiting state is connecting the call of the first user card; and turning off uplink and downlink audio of the first user card, so that the first user card waits.

In a second possible implementation manner of the first aspect, the setting the first user card to a conversation state, and setting the second user card to a waiting state is connecting the call of the first user card; and turning off uplink and downlink audio of the second user card, so that the second user card waits.

In a third possible implementation manner of the first aspect, the simultaneously setting the first user card and the second user card to a conversation state, to implement a conference call is connecting the call of the first user card; acquiring downlink audio data of the first user card and the second user card; sending downlink audio data of a user card of the first user card and the second user card except a third user card and audio data acquired by an audio collection apparatus of the multi-SIM multi-active terminal as uplink audio data of the third user card, where the third user card is any user card of the first user card and the second user card; and outputting the downlink audio data of the first user card and the second user card by using an audio output apparatus of the multi-SIM multi-active terminal, so that the first user card and the second user card implement a conference call.

With reference to the first aspect or the first possible implementation manner of the first aspect or the second possible implementation manner of the first aspect or the third possible implementation manner of the first aspect, in a fourth possible implementation manner, the multiple user cards register with a centralized service state management module of the multi-SIM multi-active terminal, and when the first user card is used for receiving a call, before the determining call statuses of the multiple user cards according to a connection list in the centralized call management module, the method further includes determining, by the multi-SIM multi-active terminal according to a status list in the centralized service state management module, whether the first user card is in a roaming state, where the status list is used to record service state data of the multiple user cards; and if the first user card is not in a roaming state, determining, by the multi-SIM multi-active terminal, the call statuses of the multiple user cards according to the connection list in the centralized call management module; or if the first user card is in a roaming state, terminating, by the multi-SIM multi-active terminal, the call received by using the first user card; determining, by the multi-SIM multi-active terminal according to the status list, a user card that is not in a roaming state among the multiple user cards; and sending, by the multi-SIM multi-active terminal, a short message service message to a terminal of a calling user, where the short message service message carries information about the user card that is not in a roaming state among the multiple user cards, so as to prompt the calling user to make a call to the user card that is not in a roaming state among the multiple user cards.

With reference to the fourth possible implementation manner of the first aspect, in a fifth possible implementation manner, before the determining, according to a status list in the centralized service state management module, whether the first user card is in a roaming state, the method further includes receiving, by the multi-SIM multi-active terminal, a call receiving message, where the call receiving message carries a call receiving identifier of the first user card; and determining, by the multi-SIM multi-active terminal according to the call receiving identifier of the first user card, that the first user card is used for receiving a call.

With reference to the first aspect or the first possible implementation manner of the first aspect or the second possible implementation manner of the first aspect or the third possible implementation manner of the first aspect, in a sixth possible implementation manner, the multiple user cards register with a centralized service state management module of the multi-SIM multi-active terminal, and when the first user card is used for making a call, before the determining call statuses of the multiple user cards according to a connection list in the centralized call management module, the method further includes determining, by the multi-SIM multi-active terminal, service quality of the multiple user cards according to a status list in the centralized service state management module; and prompting, by the multi-SIM multi-active terminal, a user to select a user card that has the best service quality among the multiple user cards to make a call, or automatically selecting a user card that has the best service quality among the multiple user cards to make a call.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect or the sixth possible implementation manner of the first aspect, in a seventh possible implementation manner, the connection data includes a first identifier of a user card, where the first identifier of the user card is used to identify a user card corresponding to the connection data.

With reference to the fourth possible implementation manner of the first aspect or the fifth possible implementation manner of the first aspect or the sixth possible implementation manner of the first aspect or the seventh possible implementation manner of the first aspect, in an eighth possible implementation manner, the service state data includes a second identifier of a user card, where the second identifier of the user card is used to identify a user card corresponding to the service state data.

According to a second aspect, the present embodiment of the disclosure provides a call management apparatus for a multi-SIM multi-active terminal, where multiple user cards are installed in the multi-SIM multi-active terminal, where the multiple user cards register with a centralized call management module of the multi-SIM multi-active terminal, and the call management apparatus includes a first determining unit configured to, when a first user card is used for making a call or receiving a call, determine call statuses of the multiple user cards according to a connection list in the centralized call management module, where the connection list is used to record connection data of the multiple user cards; and a processing unit configured to, when a second user card is in a conversation state, set the first user card to a waiting state; or set the first user card to a conversation state, and set the second user card to a waiting state; or simultaneously set the first user card and the second user card to a conversation state, to implement a conference call, where the first user card is at least one user card of the multiple user cards, and the second user card is at least one user card of the multiple user cards except the first user card.

In a first possible implementation manner of the second aspect, the processing unit is configured to connect the first user card; and turn off uplink and downlink audio of the first user card, so that the first user card waits.

In a second possible implementation manner of the second aspect, the processing unit is configured to connect the first user card; and turn off uplink and downlink audio of the second user card, so that the second user card waits.

In a third possible implementation manner of the second aspect, the processing unit is configured to connect the first user card; acquire downlink audio data of the first user card and the second user card; send downlink audio data of a user card of the first user card and the second user card except a third user card and audio data acquired by an audio collection apparatus of the multi-SIM multi-active terminal as uplink audio data of the third user card, where the third user card is any user card of the first user card and the second user card; and output the downlink audio data of the first user card and the second user card by using an audio output apparatus of the multi-SIM multi-active terminal, so that the first user card and the second user card implement a conference call.

With reference to the second aspect or the first possible implementation manner of the second aspect or the second possible implementation manner of the second aspect or the third possible implementation manner of the second aspect, in a fourth possible implementation manner, the multiple user cards register with a centralized service state management module of the multi-SIM multi-active terminal, and the apparatus further includes a second determining unit configured to, when the first user card is used for receiving a call, before the determining call statuses of the multiple user cards according to a connection list in the centralized call management module, determine, according to a status list in the centralized service state management module, whether the first user card is in a roaming state, where the status list is used to record service state data of the multiple user cards; and if the first user card is not in a roaming state, the first determining unit determines the call statuses of the multiple user cards according to the connection list in the centralized call management module; or if the first user card is in a roaming state, the processing unit is further configured to terminate the call received by using the first user card; the second determining unit is further configured to determine, according to the status list, a user card that is not in a roaming state among the multiple user cards; and a sending unit configured to send a short message service message to a terminal of a calling user, where the short message service message carries information about the user card that is not in a roaming state among the multiple user cards, so as to prompt the calling user to make a call to the user card that is not in a roaming state among the multiple user cards.

With reference to the fourth possible implementation manner of the second aspect, in a fifth possible implementation manner, the apparatus further includes a receiving unit configured to, before the determining, according to a status list in the centralized service state management module, whether the first user card is in a roaming state, receive a call receiving message, where the call receiving message carries a call receiving identifier of the first user card; and a third determining unit configured to determine, according to the call receiving identifier of the first user card, that the first user card is used for receiving a call.

With reference to the second aspect or the first possible implementation manner of the second aspect or the second possible implementation manner of the second aspect or the third possible implementation manner of the second aspect, in a sixth possible implementation manner, the multiple user cards register with a centralized service state management module of the multi-SIM multi-active terminal, and the apparatus further includes a second determining unit configured to, when the first user card is used for making a call, before the determining call statuses of the multiple user cards according to a connection list in the centralized call management module, determine service quality of the multiple user cards according to a status list in the centralized service state management module; and a selection unit configured to prompt a user to select a user card that has the best service quality among the multiple user cards to make a call, or automatically select a user card that has the best service quality among the multiple user cards to make a call.

With reference to the second aspect or the first possible implementation manner of the second aspect or the second possible implementation manner of the second aspect or the third possible implementation manner of the second aspect or the fourth possible implementation manner of the second aspect or the fifth possible implementation manner of the second aspect or the sixth possible implementation manner of the second aspect, in a seventh possible implementation manner, the connection data includes a first identifier of a user card, where the first identifier of the user card is used to identify a user card corresponding to the connection data.

With reference to the fourth possible implementation manner of the second aspect or the fifth possible implementation manner of the second aspect or the sixth possible implementation manner of the second aspect or the seventh possible implementation manner of the second aspect, in an eighth possible implementation manner, the service state data includes a second identifier of a user card, where the second identifier of the user card is used to identify a user card corresponding to the service state data.

By using the foregoing solutions, when a first user card is used for making a call or receiving a call, a multi-SIM multi-active terminal may learn a call status of another user card according to a connection list in a centralized call management module, and if a second user card is in a conversation state, the multi-SIM multi-active terminal may set the first user card to a waiting state, or may simultaneously set the first user card and the second user card to a conversation state, to implement a conference call. Because the connection list records connection data of all user cards installed in the multi-SIM multi-active terminal, the multi-SIM multi-active terminal can simultaneously learn a state of each user card according to the connection list and perform call management, and can perform centralized call management for multiple user cards served by different networks, so that the multiple user cards served by different networks can implement a conference call.

DETAILED DESCRIPTION

To make the objectives, technical solutions, and advantages of the present disclosure clearer, the following further describes the present disclosure in detail with reference to the accompanying drawings. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
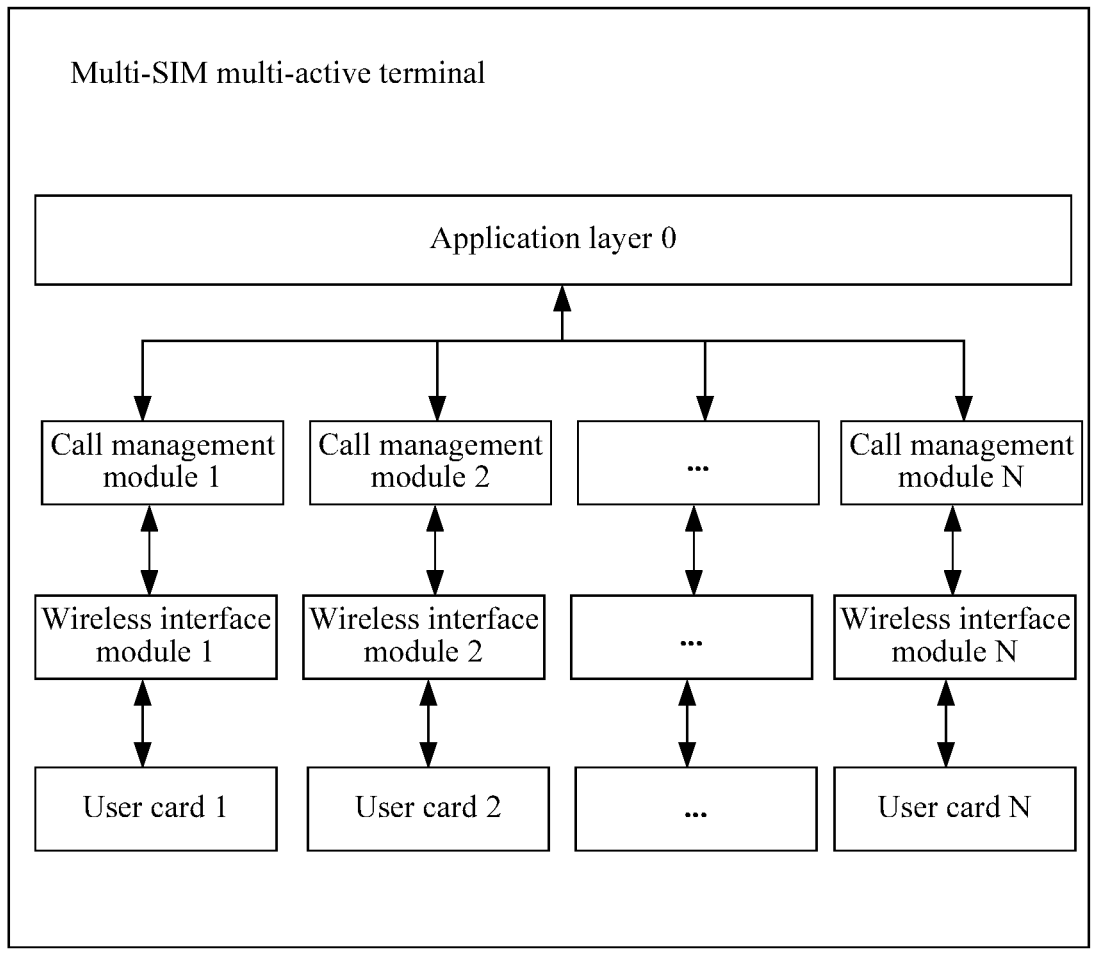
FIG. 1 is a schematic structural diagram of a multi-SIM multi-active terminal in the prior art.
Figure 2:
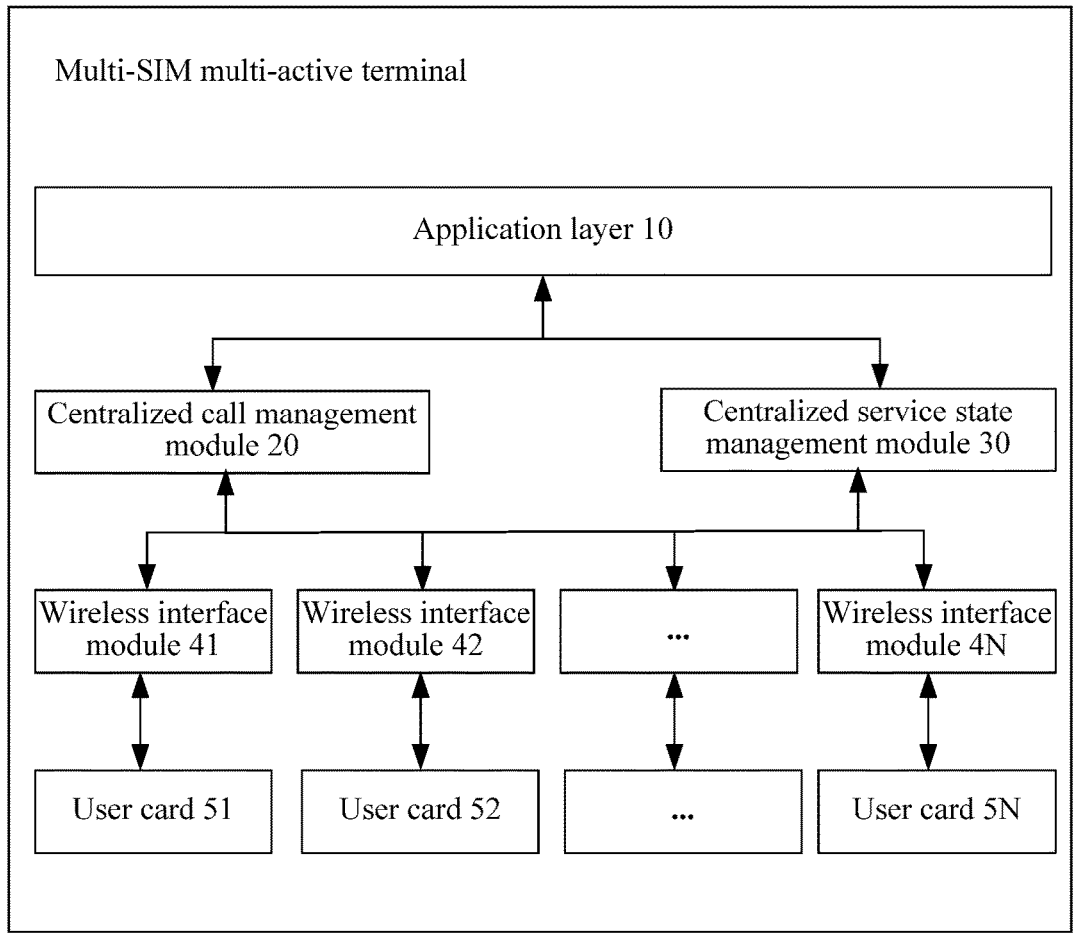
FIG. 2 is a schematic structural diagram of a multi-SIM multi-active terminal to which a call management method for a multi-SIM multi-active terminal provided in the present embodiment of the disclosure applies.

First, an application scenario of a call management method and apparatus for a multi-SIM multi-active terminal that are provided in the present embodiment of the disclosure is described. As shown in FIG. 2, the multi-SIM multi-active terminal includes an application layer 10, a centralized call management module 20, a centralized service state management module 30, a wireless interface module 41, a wireless interface module 42, . . . , a wireless interface module 4N, and a user card 51, a user card 52, . . . , a user card 5N that are installed in the multi-SIM multi-active terminal. The user card 51 to the user card 5N may be user cards served by a same network, or may be user cards served by different networks. A wireless interface 41 to a wireless interface 4N are connected to a user card 51 to a user card 5N in a one-to-one correspondence manner, the wireless interface module 41 to the wireless interface module 4N are separately connected to the centralized call management module 20 and the centralized service state management module 30, and both the centralized call management module 20 and the centralized service state management module 30 are connected to the application layer 10. The user card 51 to the user card 5N separately register with the centralized call management module 20 and the centralized service state management module 30 by using the wireless interface module 41 to the wireless interface module 4N. A connection list in the centralized call management module 20 is used to record connection data of the user card 51 to the user card 5N, and it can be learned, according to the connection data, whether a user card is in a conversation state. A status list in the centralized service state management module 30 is used to record service state data of the user card 51 to the user card 5N, and it can be learned, according to the service state data, whether a user card is in a roaming state and/or service quality of a user card. The multi-SIM multi-active terminal can simultaneously learn a call status of each user card according to the connection list in the centralized call management module 20. Therefore, when the multi-SIM multi-active terminal is used to perform call management, centralized call management can be implemented for multiple user cards served by different networks, so that the multiple user cards served by different networks can implement a conference call.

Figure 3:
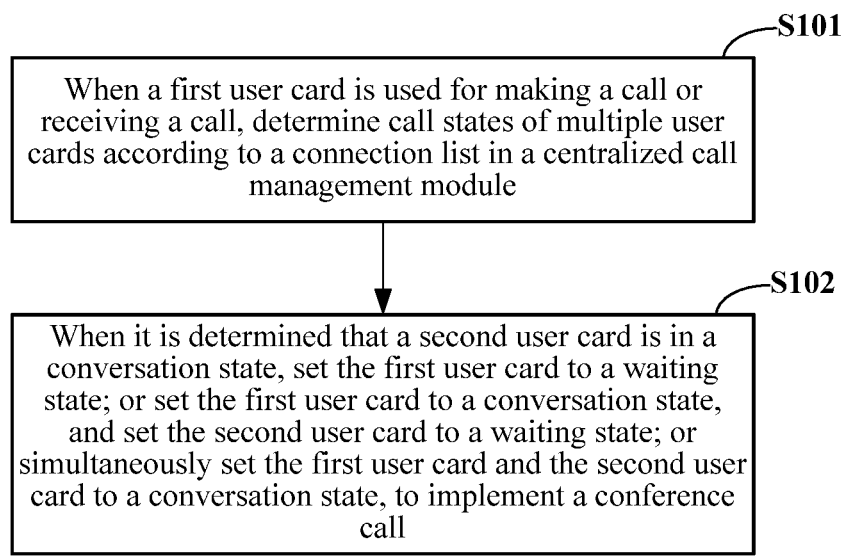
FIG. 3 is a schematic flowchart of a call management method for a multi-SIM multi-active terminal according to Embodiment 1 of the present disclosure.

In the following, a call management method for a multi-SIM multi-active terminal provided in Embodiment 1 of the present disclosure is described in detail by using FIG. 3 as an example. FIG. 3 is a schematic flowchart of a call management method for a multi-SIM multi-active terminal according to Embodiment 1 of the present disclosure. The call management method for a multi-SIM multi-active terminal is executed by a multi-SIM multi-active terminal. Multiple user cards are installed in the multi-SIM multi-active terminal, where the multiple user cards may be user cards served by a same network, or may be user cards served by different networks, and the multiple user cards register with both a centralized call management module and a centralized service state management module of the multi-SIM multi-active terminal. As shown in FIG. 3, the call management method for a multi-SIM multi-active terminal includes the following steps.

Step S101: When a first user card is used for making a call or receiving a call, determine call statuses of multiple user cards according to a connection list in a centralized call management module.

The first user card is at least one user card of the multiple user cards installed in the multi-SIM multi-active terminal.

The connection list is used to record connection data of the multiple user cards, and it can be learned, according to the connection data, whether a user card is in a conversation state. Therefore, the multi-SIM multi-active terminal can simultaneously learn, according to the connection list, whether all the user cards are in a conversation state.

Optionally, the connection data in the connection list includes a first identifier of a user card, where the first identifier of the user card is used to identify a user card corresponding to the connection data. That is, when querying the connection list, the multi-SIM multi-active terminal distinguishes connection data of each user card according to the first identifier of the user card.

If it is determined that a second user card is not in a conversation state, the first user card is set to a conversation state. The second user card is at least one user card of the multiple user cards installed in the multi-SIM multi-active terminal except the first user card.

If the second user card is a conversation state, step S102 is performed.

Step S102: When it is determined that a second user card is in a conversation state, set the first user card to a waiting state; or set the first user card to a conversation state, and set the second user card to a waiting state; or simultaneously set the first user card and the second user card to a conversation state, to implement a conference call.

When the first user card is used for making a call or receiving a call, when the multi-SIM multi-active terminal learns, according to the connection list, that the second user card is currently in a conversation state, and the first user card does not need to join a current conversation with the second user card, the multi-SIM multi-active terminal connects the first user card, and turns off uplink and downlink audio of the first user card at the same time, so that the first user card waits.

When the first user card is used for making a call or receiving a call, when the multi-SIM multi-active terminal learns, according to the connection list, that the second user card is currently in a conversation state, and the second user card currently in a call does not need to join a conversation with the first user card, the multi-SIM multi-active terminal connects the first user card, and turns off uplink and downlink audio of the second user card at the same time, so that the second user card waits.

When the first user card is used for making a call or receiving a call, when the multi-SIM multi-active terminal learns, according to the connection list, that the second user card is currently in a conversation state, and the first user card also needs to join a current conversation with the second user card, the multi-SIM multi-active terminal connects the first user card; then acquires downlink audio data of the first user card and the second user card; sends downlink audio data of a user card of the first user card and the second user card except a third user card and audio data acquired by an audio collection apparatus of the multi-SIM multi-active terminal as uplink audio data of the third user card, where the third user card is any user card of the first user card and the second user card; and outputs the downlink audio data of the first user card and the second user card by using an audio output apparatus of the multi-SIM multi-active terminal, so that the first user card and the second user card implement a conference call.

In a specific example, when a user card 51 and a user card 52 are both in a conversation state, a user card 53 and a user card 54 are used for making a call or receiving a call. In order that the user card 51, the user card 52, the user card 53, and the user card 54 are all in a conversation state and can communicate with each other to implement a conference call, the user card 53 and the user card 54 are connected, and downlink audio data of the user card 51, the user card 52, the user card 53, and the user card 54 is acquired separately. Downlink audio data of the user card 52, the user card 53, and the user card 54 and audio data acquired by an audio collection apparatus of the multi-SIM multi-active terminal are sent as uplink audio data of the user card 51; likewise, downlink audio data of the user card 51, the user card 53, and the user card 54 and the audio data acquired by the audio collection apparatus of the multi-SIM multi-active terminal are sent as uplink audio data of the user card 52; downlink audio data of the user card 51, the user card 52, and the user card 54 and the audio data acquired by the audio collection apparatus of the multi-SIM multi-active terminal are sent as uplink audio data of the user card 53; downlink audio data of the user card 51, the user card 52, and the user card 53 and the audio data acquired by the audio collection apparatus of the multi-SIM multi-active terminal are sent as uplink audio data of the user card 54; and the downlink audio data of the user card 51, the user card 52, the user card 53, and the user card 54 is output by using an audio output apparatus of the multi-SIM multi-active terminal; therefore, the user card 51, the user card 52, the user card 53, and the user card 54 are simultaneously in a call, and can communicate with each other to implement a conference call.

In addition, optionally, the call management method for a multi-SIM multi-active terminal may further include, before the first user card is used for making a call, determining service quality of the multiple user cards according to a status list in the centralized service state management module.

The status list is used to record service state data of the multiple user cards, and it can be learned, according to the service state data, service quality of a user card. Therefore, the multi-SIM multi-active terminal can simultaneously learn service quality of all the user cards according to the status list.

Optionally, the service state data on the status list includes a second identifier of a user card, where the second identifier of the user card is used to identify a user card corresponding to the service state data. That is, when querying the status list, the multi-SIM multi-active terminal distinguishes service state data of each user card according to the second identifier of the user card.

A user is prompted to select a user card that has the best service quality among the multiple user cards to make a call, or a user card that has the best service quality among the multiple user cards is automatically selected to make a call, thereby ensuring call quality when a call is made.

By using the call management method for a multi-SIM multi-active terminal provided in Embodiment 1 of the present disclosure, when a first user card is used for making a call or receiving a call, a multi-SIM multi-active terminal may learn a call status of another user card according to a connection list in a centralized call management module, and if a second user card is in a conversation state, the multi-SIM multi-active terminal may set the first user card to a waiting state, or may simultaneously set the first user card and the second user card to a conversation state, to implement a conference call. Because the connection list records connection data of all user cards installed in the multi-SIM multi-active terminal, the multi-SIM multi-active terminal can simultaneously learn a state of each user card according to the connection list and perform call management, and can perform centralized call management for multiple user cards served by different networks, so that the multiple user cards served by different networks can implement a conference call.

Figure 4:
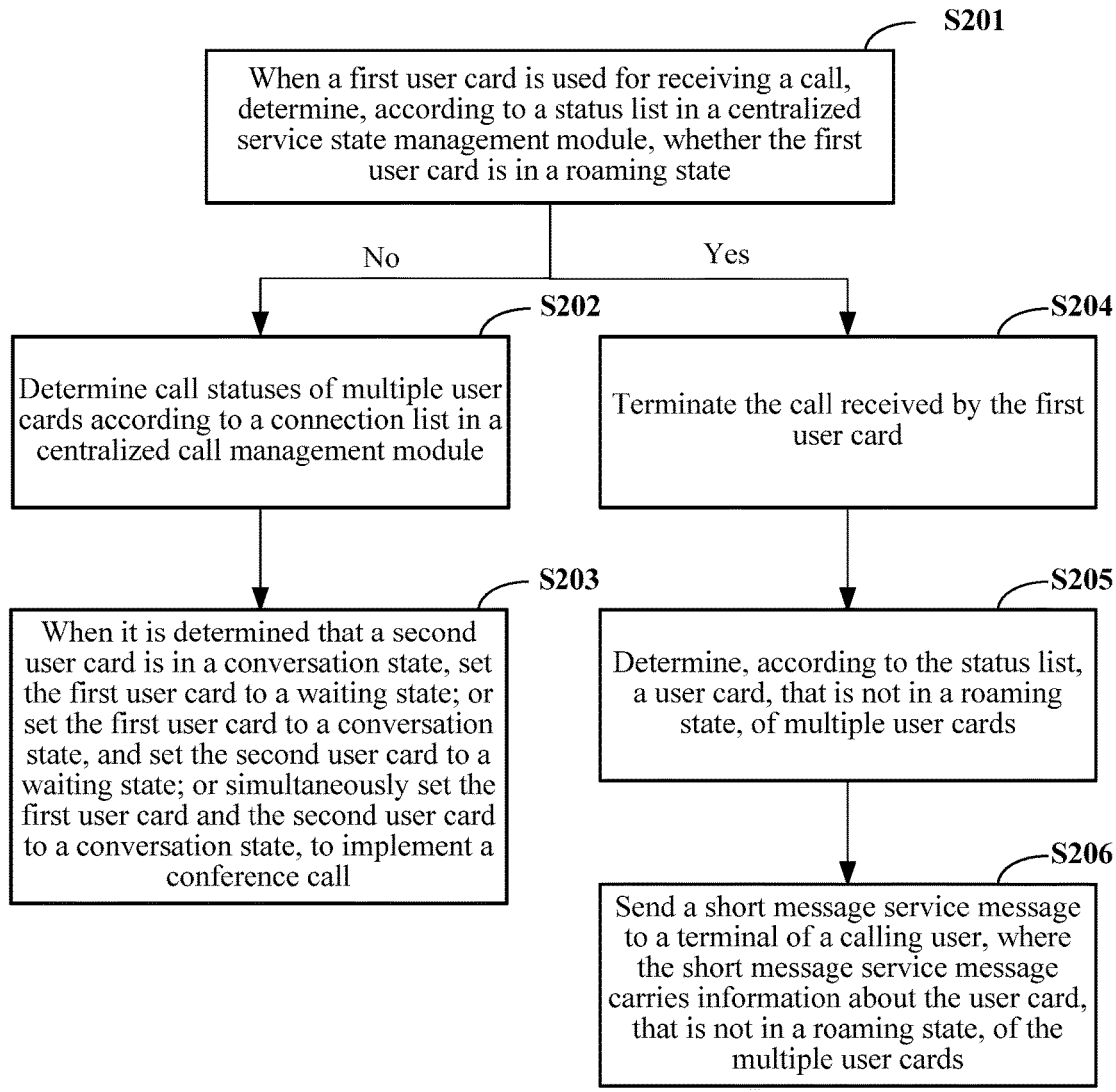
FIG. 4 is a schematic flowchart of a call management method for a multi-SIM multi-active terminal according to Embodiment 2 of the present disclosure.

In the following, a call management method for a multi-SIM multi-active terminal provided in Embodiment 2 of the present disclosure is described in detail by using FIG. 4 as an example. FIG. 4 is a schematic flowchart of a call management method for a multi-SIM multi-active terminal according to Embodiment 2 of the present disclosure. The call management method for a multi-SIM multi-active terminal is executed by a multi-SIM multi-active terminal. Multiple user cards are installed in the multi-SIM multi-active terminal, where the multiple user cards may be user cards served by a same network, or may be user cards served by different networks, and the multiple user cards separately register with a centralized call management module and a centralized service state management module of the multi-SIM multi-active terminal. As shown in FIG. 4, the call management method for a multi-SIM multi-active terminal includes the following steps.

Step S201: When a first user card is used for receiving a call, determine, according to a status list in a centralized service state management module, whether a first user card is in a roaming state.

The first user card is at least one user card of the multiple user cards installed in the multi-SIM multi-active terminal.

The status list is used to record service state data of the multiple user cards, and it can be learned, according to the service state data, whether a user card is in a roaming state. Therefore, the multi-SIM multi-active terminal can simultaneously learn, according to the status list, whether all the user cards are in a roaming state.

Optionally, the service state data on the status list includes a second identifier of a user card, where the second identifier of the user card is used to identify a user card corresponding to the service state data. That is, when querying the status list, the multi-SIM multi-active terminal distinguishes service state data of each user card according to the second identifier of the user card.

If the first user card is not in a roaming state, steps S202 and S203 are performed; if the first user card is in a roaming state, steps S204 to S206 are performed.

Optionally, before the determining, according to a status list in the centralized service state management module, whether the first user card is in a roaming state, the method may further include receiving a call receiving message, where the call receiving message carries a call receiving identifier of the first user card; and determining, by the multi-SIM multi-active terminal according to the call receiving identifier of the first user card that is carried in the call receiving message, that the first user card is used for receiving a call.

Step S202: Determine call statuses of the multiple user cards according to a connection list in the centralized call management module.

The connection list is used to record connection data of the multiple user cards, and it can be learned, according to the connection data, whether a user card is in a conversation state. Therefore, the multi-SIM multi-active terminal can simultaneously learn, according to the connection list, whether all the user cards are in a conversation state.

Optionally, the connection data in the connection list includes a first identifier of a user card, where the first identifier of the user card is used to identify a user card corresponding to the connection data. That is, when querying the connection list, the multi-SIM multi-active terminal distinguishes connection data of each user card according to the first identifier of the user card.

If a second user card is not in a conversation state, the first user card is set to a conversation state. The second user card is at least one user card of the multiple user cards installed in the multi-SIM multi-active terminal except the first user card.

If the second user card is a conversation state, step S203 is performed.

Step S203: When it is determined that a second user card is in a conversation state, set the first user card to a waiting state; or set the first user card to a conversation state, and set the second user card to a waiting state; or simultaneously set the first user card and the second user card to a conversation state, to implement a conference call.

When the first user card is used for receiving a call, when the multi-SIM multi-active terminal learns, according to the connection list, that the second user card is currently in a conversation state, and the first user card does not need to join a current conversation with the second user card, the multi-SIM multi-active terminal connects the first user card, and turns off uplink and downlink audio of the first user card at the same time, so that the first user card waits.

When the first user card is used for receiving a call, when the multi-SIM multi-active terminal learns, according to the connection list, that the second user card is currently in a conversation state, and the second user card currently in a call does not need to join a conversation with the first user card, the multi-SIM multi-active terminal connects the first user card, and turns off uplink and downlink audio of the second user card at the same time, so that the second user card waits.

When the first user card is used for receiving a call, when the multi-SIM multi-active terminal learns, according to the connection list, that the second user card is currently in a conversation state, and the first user card also needs to join a current conversation with the second user card, the multi-SIM multi-active terminal connects the first user card; then acquires downlink audio data of the first user card and the second user card; sends downlink audio data of a user card of the first user card and the second user card except a third user card and audio data acquired by an audio collection apparatus of the multi-SIM multi-active terminal as uplink audio data of the third user card, where the third user card is any user card of the first user card and the second user card; and outputs the downlink audio data of the first user card and the second user card by using an audio output apparatus of the multi-SIM multi-active terminal, so that the first user card and the second user card implement a conference call.

In a specific example, when a user card 51 and a user card 52 are both in a conversation state, a user card 53 and a user card 54 are used for receiving a call. In order that the user card 51, the user card 52, the user card 53, and the user card 54 are all in a conversation state and can communicate with each other to implement a conference call, the user card 53 and the user card 54 are connected, and downlink audio data of the user card 51, the user card 52, the user card 53, and the user card 54 is acquired separately Downlink audio data of the user card 52, the user card 53, and the user card 54 and audio data acquired by an audio collection apparatus of the multi-SIM multi-active terminal are sent as uplink audio data of the user card 51; likewise, downlink audio data of the user card 51, the user card 53, and the user card 54 and the audio data acquired by the audio collection apparatus of the multi-SIM multi-active terminal are sent as uplink audio data of the user card 52; downlink audio data of the user card 51, the user card 52, and the user card 54 and the audio data acquired by the audio collection apparatus of the multi-SIM multi-active terminal are sent as uplink audio data of the user card 53; downlink audio data of the user card 51, the user card 52, and the user card 53 and the audio data acquired by the audio collection apparatus of the multi-SIM multi-active terminal are sent as uplink audio data of the user card 54; and the downlink audio data of the user card 51, the user card 52, the user card 53, and the user card 54 is output by using an audio output apparatus of the multi-SIM multi-active terminal; therefore, the user card 51, the user card 52, the user card 53, and the user card 54 are simultaneously in a call, and can communicate with each other to implement a conference call.

Step S204: Terminate the call received by using the first user card.

Because it is determined that the first user card is in a roaming state, to avoid roaming charges, the call received by using the first user card may be terminated directly.

Step S205: Determine, according to the status list, a user card that is not in a roaming state among the multiple user cards.

Step S206: Send a short message service message to a terminal of a calling user, where the short message service message carries information about the user card that is not in a roaming state among the multiple user cards.

The information about the user card may be a call number. The multi-SIM multi-active terminal prompts, by using the short message service message, the calling user with the user card that is not in a roaming state among the multiple user cards installed in the multi-SIM multi-active terminal, that is, prompts the calling user to call the user card that is not in a roaming state among the multiple user cards installed in the multi-SIM multi-active terminal, thereby reducing roaming charges of the user card that is in a roaming state.

By using the call management method for a multi-SIM multi-active terminal provided in Embodiment 2 of the present disclosure, when a first user card is used for receiving a call, it may be determined, according to a status list in a centralized service state management module, whether the first user card is in a roaming state, and if the first user card is in a roaming state, the call received by using the first user card is terminated, thereby reducing roaming charges of the first user card; if the first user card is not in a roaming state, a call status of another user card is learned according to a connection list in a centralized call management module, and if a second user card is in a conversation state, the first user card may be set to a waiting state, or the first user card and the second user card are simultaneously set to a conversation state, to implement a conference call. Because the connection list records connection data of all user cards installed in the multi-SIM multi-active terminal, the multi-SIM multi-active terminal can simultaneously learn a state of each user card according to the connection list and perform call management, and can perform centralized call management for multiple user cards served by different networks, so that the multiple user cards served by different networks can implement a conference call.

It can be understood that the communications methods for a multi-SIM multi-active terminal that are provided in Embodiment 1 and Embodiment 2 of the present disclosure may be used in combination.

Figure 5:
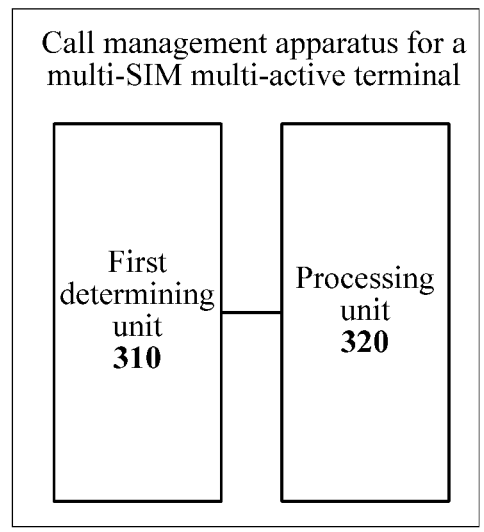
FIG. 5 is a schematic structural diagram of a call management apparatus for a multi-SIM multi-active terminal according to Embodiment 3 of the present disclosure.

In the following, a call management apparatus for a multi-SIM multi-active terminal provided in Embodiment 3 of the present disclosure is described in detail by using FIG. 5 as an example. FIG. 5 is a schematic structural diagram of a call management apparatus for a multi-SIM multi-active terminal according to Embodiment 3 of the present disclosure. The call management apparatus is applied to a multi-SIM multi-active terminal. Multiple user cards are installed in the multi-SIM multi-active terminal, where the multiple user cards may be user cards served by a same network, or may be user cards served by different networks, and the multiple user cards register with a centralized call management module and a centralized service state management module of the multi-SIM multi-active terminal. The call management apparatus is configured to implement the call management method for a multi-SIM multi-active terminal shown in FIG. 3.

As shown in FIG. 5, the call management apparatus for a multi-SIM multi-active terminal includes a first determining unit 310 and a processing unit 320.

The first determining unit 310 is configured to, when a first user card is used for making a call or receiving a call, determine call statuses of the multiple user cards according to a connection list in the centralized call management module.

The first user card is at least one user card of the multiple user cards installed in the multi-SIM multi-active terminal.

The connection list is used to record connection data of the multiple user cards, and it can be learned, according to the connection data, whether a user card is in a conversation state. Therefore, the first determining unit 310 can simultaneously learn, according to the connection list, whether all the user cards are in a conversation state.

Optionally, the connection data in the connection list includes a first identifier of a user card, where the first identifier of the user card is used to identify a user card corresponding to the connection data. That is, when querying the connection list, the first determining unit 310 distinguishes connection data of each user card according to the first identifier of the user card.

The processing unit 320 is configured to, when it is determined that a second user card is in a conversation state, set the first user card to a waiting state; or set the first user card to a conversation state, and set the second user card to a waiting state; or simultaneously set the first user card and the second user card to a conversation state, to implement a conference call.

The second user card is at least one user card of the multiple user cards installed in the multi-SIM multi-active terminal except the first user card.

When the first user card is used for making a call or receiving a call, when it is learned according to the connection list that the second user card is currently in a conversation state, and the first user card does not need to join a current conversation with the second user card, the processing unit 320 connects the first user card, and turns off uplink and downlink audio of the first user card at the same time, so that the first user card waits.

When the first user card is used for making a call or receiving a call, when the multi-SIM multi-active terminal learns, according to the connection list, that the second user card is currently in a conversation state, and the second user card currently in a call does not need to join a conversation with the first user card, the processing unit 320 connects the first user card, and turns off uplink and downlink audio of the second user card at the same time, so that the second user card waits.

When the first user card is used for making a call or receiving a call, when it is learned according to the connection list that the second user card is currently in a conversation state, and the first user card also needs to join a current conversation with the second user card, the processing unit 320 connects the first user card; then acquires downlink audio data of the first user card and the second user card; sends downlink audio data of a user card of the first user card and the second user card except a third user card and audio data acquired by an audio collection apparatus of the multi-SIM multi-active terminal as uplink audio data of the third user card, where the third user card is any user card of the first user card and the second user card; and outputs the downlink audio data of the first user card and the second user card by using an audio output apparatus of the multi-SIM multi-active terminal, so that the first user card and the second user card implement a conference call.

The processing unit 320 is further configured to, if the second user card is not in a conversation state, set the first user card to a conversation state.

Figure 6:
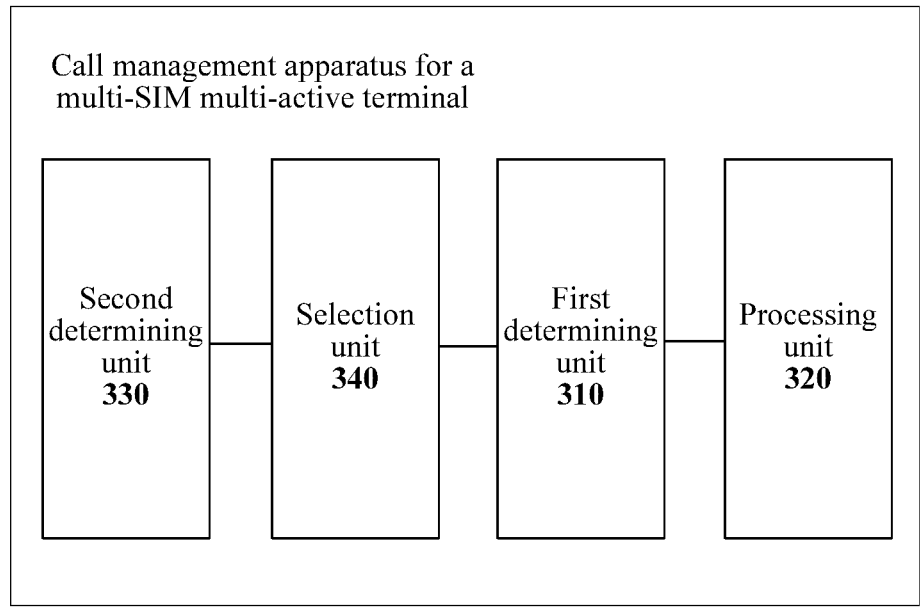
FIG. 6 is a schematic structural diagram of another call management apparatus for a multi-SIM multi-active terminal according to Embodiment 3 of the present disclosure.

In addition, as shown in FIG. 6, the call management apparatus may further include a second determining unit 330 and a selection unit 340.

The second determining unit 330 is configured to, before the first user card is used for making a call, determine service quality of the multiple user cards according to a status list in the centralized service state management module.

The status list is used to record service state data of the multiple user cards, and it can be learned, according to the service state data, service quality of a user card. Therefore, the second determining unit 330 can simultaneously learn service quality of all the user cards according to the status list.

Optionally, the service state data on the status list includes a second identifier of a user card, where the second identifier of the user card is used to identify a user card corresponding to the service state data. That is, when querying the status list, the second determining unit 330 distinguishes service state data of each user card according to the second identifier of the user card.

The selection unit 340 is configured to prompt a user to select a user card that has the best service quality among the multiple user cards to make a call, or automatically select a user card that has the best service quality among the multiple user cards to make a call, thereby ensuring call quality when a call is made.

By using the call management apparatus for a multi-SIM multi-active terminal provided in Embodiment 3 of the present disclosure, when a first user card is used for making a call or receiving a call, a multi-SIM multi-active terminal may learn a call status of another user card according to a connection list in a centralized call management module, and if a second user card is in a conversation state, the multi-SIM multi-active terminal may set the first user card to a waiting state, or may simultaneously set the first user card and the second user card to a conversation state, to implement a conference call. Because the connection list records connection data of all user cards installed in the multi-SIM multi-active terminal, the multi-SIM multi-active terminal can simultaneously learn a state of each user card according to the connection list and perform call management, and can perform centralized call management for multiple user cards served by different networks, so that the multiple user cards served by different networks can implement a conference call.

Figure 7:
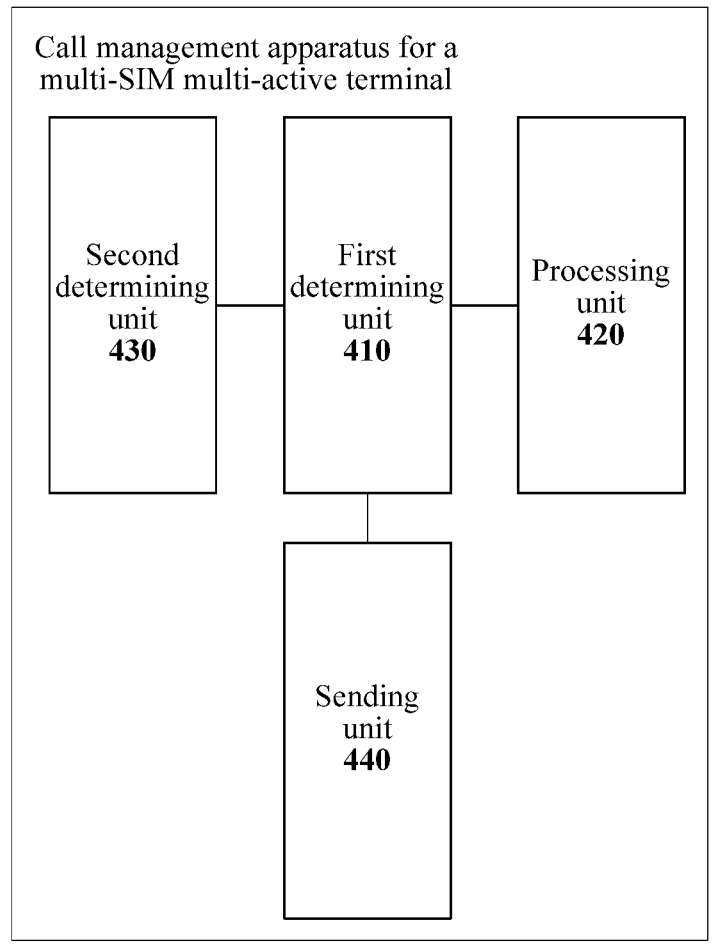
FIG. 7 is a schematic structural diagram of a call management apparatus for a multi-SIM multi-active terminal according to Embodiment 4 of the present disclosure.

In the following, a call management apparatus for a multi-SIM multi-active terminal provided in Embodiment 4 of the present disclosure is described in detail by using FIG. 7 as an example. FIG. 7 is a schematic structural diagram of a call management apparatus for a multi-SIM multi-active terminal according to Embodiment 4 of the present disclosure. The call management apparatus is applied to a multi-SIM multi-active terminal. Multiple user cards are installed in the multi-SIM multi-active terminal, where the multiple user cards may be user cards served by a same network, or may be user cards served by different networks, and the multiple user cards separately register with a centralized call management module and a centralized service state management module of the multi-SIM multi-active terminal. The call management apparatus is configured to implement the call management method for a multi-SIM multi-active terminal shown in FIG. 4.

As shown in FIG. 7, the call management apparatus for a multi-SIM multi-active terminal includes a first determining unit 410, a processing unit 420, a second determining unit 430, and a sending unit 440.

The second determining unit 430 is configured to, when a first user card is used for receiving a call, determine, according to a status list in the centralized service state management module, whether the first user card is in a roaming state.

The first user card is at least one user card of the multiple user cards installed in the multi-SIM multi-active terminal.

The status list is used to record service state data of the multiple user cards, and it can be learned, according to the service state data, whether a user card is in a roaming state.

Therefore, the second determining unit 430 can simultaneously learn, according to the status list, whether all the user cards are in a roaming state.

Optionally, the service state data on the status list includes a second identifier of a user card, where the second identifier of the user card is used to identify a user card corresponding to the service state data. That is, when querying the status list, the second determining unit 430 distinguishes service state data of each user card according to the second identifier of the user card.

Figure 8:
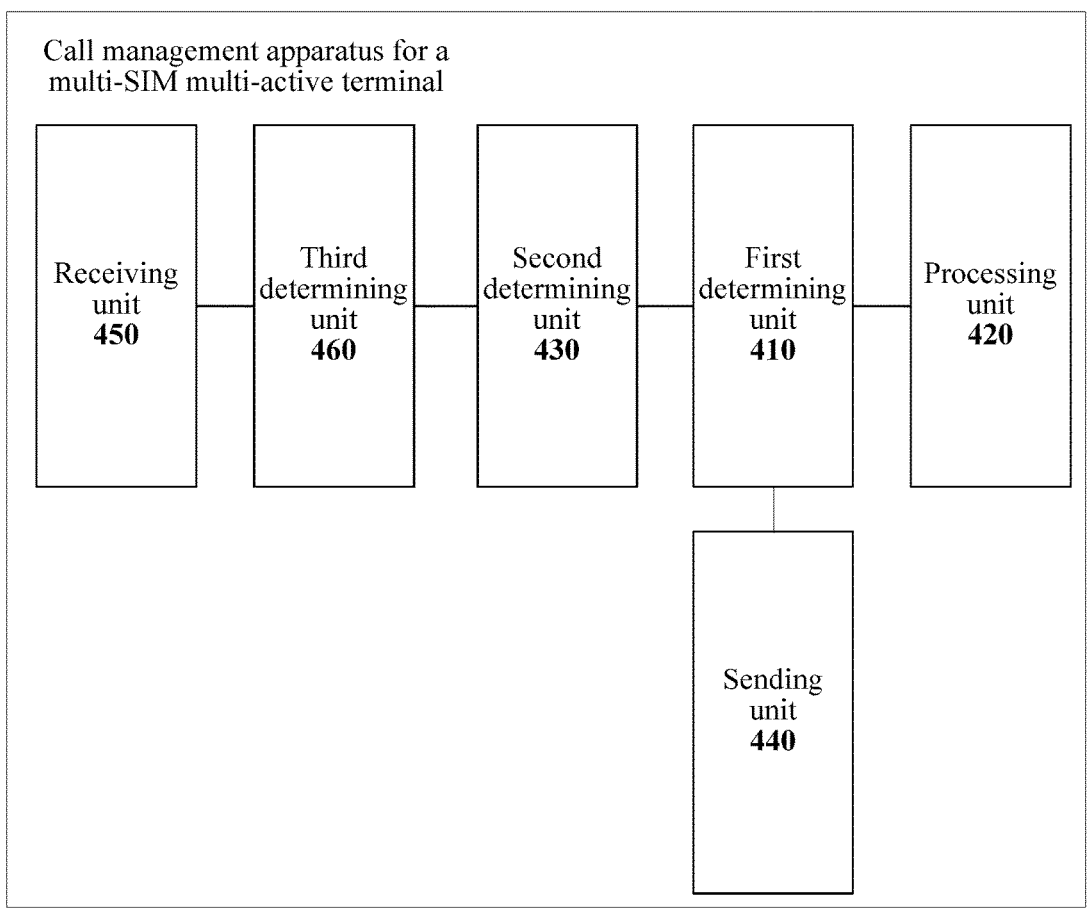
FIG. 8 is a schematic structural diagram of another call management apparatus for a multi-SIM multi-active terminal according to Embodiment 4 of the present disclosure.

Optionally, as shown in FIG. 8, the call management apparatus may further include a receiving unit 450 and a third determining unit 460. The receiving unit 450 is configured to receive a call receiving message, where the call receiving message carries a call receiving identifier of the first user card; and the third determining unit 460 is configured to determine, according to the call receiving identifier of the first user card that is carried in the call receiving message, that the first user card is used for receiving a call.

The first determining unit 410 is further configured to, when the first user card is not in a roaming state, determine call statuses of the multiple user cards according to a connection list in the centralized call management module.

The connection list is used to record connection data of the multiple user cards, and it can be learned, according to the connection data, whether a user card is in a conversation state. Therefore, the first determining unit 410 can simultaneously learn, according to the connection list, whether all the user cards are in a conversation state.

Optionally, the connection data in the connection list includes a first identifier of a user card, where the first identifier of the user card is used to identify a user card corresponding to the connection data. That is, when querying the connection list, the first determining unit 410 distinguishes connection data of each user card according to the first identifier of the user card.

The processing unit 420 is configured to, when it is determined that a second user card is in a conversation state, set the first user card to a waiting state; or set the first user card to a conversation state, and set the second user card to a waiting state; or simultaneously set the first user card and the second user card to a conversation state, to implement a conference call.

The second user card is at least one user card of the multiple user cards installed in the multi-SIM multi-active terminal except the first user card.

When the first user card is used for making a call or receiving a call, when it is learned according to the connection list that the second user card is currently in a conversation state, and the first user card does not need to join a current conversation with the second user card, the processing unit 420 connects the first user card, and turns off uplink and downlink audio of the first user card at the same time, so that the first user card waits.

When the first user card is used for receiving a call, when the multi-SIM multi-active terminal learns, according to the connection list, that the second user card is currently in a conversation state, and the second user card currently in a call does not need to join a conversation with the first user card, the processing unit 420 connects the first user card, and turns off uplink and downlink audio of the second user card at the same time, so that the second user card waits.

When the first user card is used for making a call or receiving a call, when it is learned according to the connection list that the second user card is currently in a conversation state, and the first user card also needs to join a current conversation with the second user card, the processing unit 420 connects the first user card; then acquires downlink audio data of the first user card and the second user card; sends downlink audio data of a user card of the first user card and the second user card except a third user card and audio data acquired by an audio collection apparatus of the multi-SIM multi-active terminal as uplink audio data of the third user card, where the third user card is any user card of the first user card and the second user card; and outputs the downlink audio data of the first user card and the second user card by using an audio output apparatus of the multi-SIM multi-active terminal, so that the first user card and the second user card implement a conference call.

The processing unit 420 is further configured to, if the second user card is not in a conversation state, set the first user card to a conversation state.

The processing unit 420 is further configured to, if the first user card is in a roaming state, terminate the call received by using the first user card.

Because it is determined that the first user card is in a roaming state, to avoid roaming charges, the processing unit 420 may directly terminate the call received by using the first user card.

The second determining unit 430 is further configured to determine, according to the status list, a user card that is not in a roaming state among the multiple user cards.

The sending unit 440 is configured to send a short message service message to a terminal of a calling user, where the short message service message carries information about the user card that is not in a roaming state among the multiple user cards.

The information about the user card may be a call number. The sending unit 440 prompts, by using the short message service message, the calling user with the user card that is not in a roaming state among the multiple user cards installed in the multi-SIM multi-active terminal, that is, prompts the calling user to call the user card that is not in a roaming state among the multiple user cards installed in the multi-SIM multi-active terminal, thereby reducing roaming charges of the user card that is in a roaming state.

By using the call management apparatus for a multi-SIM multi-active terminal provided in Embodiment 4 of the present disclosure, when a first user card is used for receiving a call, it may be determined, according to a status list in a centralized service state management module, whether the first user card is in a roaming state, and if the first user card is in a roaming state, the call received by using the first user card is terminated, thereby reducing roaming charges of the first user card; if the first user card is not in a roaming state, a call status of another user card is learned according to a connection list in a centralized call management module, and if a second user card is in a conversation state, the first user card may be set to a waiting state, or the first user card and the second user card are simultaneously set to a conversation state, to implement a conference call. Because the connection list records connection data of all user cards installed in the multi-SIM multi-active terminal, the multi-SIM multi-active terminal can simultaneously learn a state of each user card according to the connection list and perform call management, and can perform centralized call management for multiple user cards served by different networks, so that the multiple user cards served by different networks can implement a conference call.

It can be understood that the communications apparatuses for a multi-SIM multi-active terminal that are provided in Embodiment 3 and Embodiment 4 of the present disclosure may be used in combination.

Figure 9:
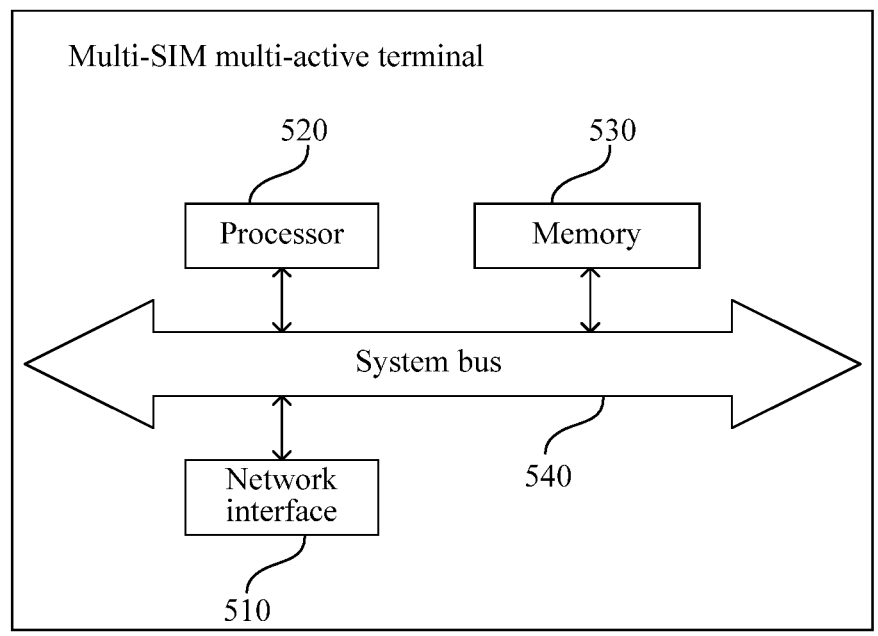
FIG. 9 is a schematic structural diagram of a multi-SIM multi-active terminal according to Embodiment 5 of the present disclosure.

In the following, a multi-SIM multi-active terminal provided in Embodiment 5 of the present disclosure is described by using FIG. 9 as an example. FIG. 9 is a schematic structural diagram of a multi-SIM multi-active terminal according to Embodiment 5 of the present disclosure. Multiple user cards are installed in the multi-SIM multi-active terminal, where the multiple user cards may be user cards served by a same network, or may be user cards served by different networks, and the multiple user cards register with a centralized call management module and a centralized service state management module of the multi-SIM multi-active terminal.

As shown in FIG. 9, the multi-SIM multi-active terminal includes a network interface 510, a processor 520, and a memory 530. A system bus 540 is configured to connect the network interface 510, the processor 520, and the memory 530.

The network interface 510 is configured to connect to a network and communicate with another device.

The memory 530 may be a permanent memory such as a hard disk drive or a flash memory, and there are a software module and a device driver inside the memory 530. The software module can execute various functional modules in the foregoing method of the present embodiment of the disclosure; and the device driver may be a network or an interface driver.

When started, these software components are loaded into the memory 530 and then are accessed by the processor 520, to execute the following instructions, when a first user card is used for making a call or receiving a call, determining call statuses of the multiple user cards according to a connection list in the centralized call management module, where the connection list is used to record connection data of the multiple user cards; and when it is determined that a second user card is in a conversation state, setting the first user card to a waiting state; or setting the first user card to a conversation state, and setting the second user card to a waiting state; or simultaneously setting the first user card and the second user card to a conversation state, to implement a conference call, where the first user card is at least one user card of the multiple user cards, and the second user card is at least one user card of the multiple user cards except the first user card.

Further, the setting the first user card to a waiting state is connecting the call of the first user card; and turning off uplink and downlink audio of the first user card, so that the first user card waits.

Further, the setting the first user card to a call state, and setting the second user card to a waiting state is connecting the call of the first user card; and turning off uplink and downlink audio of the second user card, so that the second user card waits.

Further, the setting the first user card and the second user card to a conversation state, to implement a conference call is connecting the call of the first user card; acquiring downlink audio data of the first user card and the second user card; sending downlink audio data of a user card of the first user card and the second user card except a third user card and audio data acquired by an audio collection apparatus of the multi-SIM multi-active terminal as uplink audio data of the third user card, where the third user card is any user card of the first user card and the second user card; and outputting the downlink audio data of the first user card and the second user card by using an audio output apparatus of the multi-SIM multi-active terminal, so that the first user card and the second user card implement a conference call.

Further, after accessing the software components of the memory 530, the processor further executes instructions for the following processes: when the first user card is used for receiving a call, before the determining call statuses of the multiple user cards according to a connection list in the centralized call management module, determining, according to a status list in the centralized service state management module, whether the first user card is in a roaming state, where the status list is used to record service state data of the multiple user cards; and if the first user card is not in a roaming state, determining the call statuses of the multiple user cards according to the connection list in the centralized call management module; or if the first user card is in a roaming state, terminating the call received by using the first user card; determining, according to the status list, a user card that is not in a roaming state among the multiple user cards; and sending a short message service message to a terminal of a calling user, where the short message service message carries information about the user card that is not in a roaming state among the multiple user cards, so as to prompt the calling user to make a call to the user card that is not in a roaming state among the multiple user cards.

Further, after accessing the software components of the memory 530, the processor further executes instructions for the following processes: before the determining, according to a status list in the centralized service state management module, whether the first user card is in a roaming state, receiving a call receiving message, where the call receiving message carries a call receiving identifier of the first user card; and determining, according to the call receiving identifier of the first user card, that the first user card is used for receiving a call.

Further, after accessing the software components of the memory 530, the processor further executes instructions for the following processes: when the first user card is used for making a call, before the determining call statuses of the multiple user cards according to a connection list in the centralized call management module, determining service quality of the multiple user cards according to a status list in the centralized service state management module; and prompting a user to select a user card that has the best service quality among the multiple user cards to make a call, or automatically selecting a user card that has the best service quality among the multiple user cards to make a call.

Further, the connection data includes a first identifier of a user card, where the first identifier of the user card is used to identify a user card corresponding to the connection data.

Further, the service state data includes a second identifier of a user card, where the second identifier of the user card is used to identify a user card corresponding to the service state data.

By using the multi-SIM multi-active terminal provided in Embodiment 5 of the present disclosure, when a first user card is used for making a call or receiving a call, the multi-SIM multi-active terminal may learn a call status of another user card according to a connection list in a centralized call management module, and if a second user card is in a conversation state, the multi-SIM multi-active terminal may switch the first user card to the background for waiting, or may switch the first user card to the foreground to have a conference call with the second user card. Because the connection list records connection data of all user cards installed in the multi-SIM multi-active terminal, the multi-SIM multi-active terminal can simultaneously learn a state of each user card according to the connection list and perform call management, and can perform centralized call management for multiple user cards served by different networks, so that the multiple user cards served by different networks can implement a conference call.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present disclosure are further described in detail. It should be understood that the foregoing descriptions are merely specific implementation manners of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A call management method for a multi-subscriber identity module (SIM) multi-active terminal, wherein multiple user cards are installed in the multi-SIM multi-active terminal, wherein the multiple user cards are connected to multiple wireless interface modules in a one-to-one correspondence manner, wherein the multiple user cards register with a centralized call management module of the multi-SIM multi-active terminal by using the multiple wireless interface modules respectively, wherein the centralized call management module is connected to an application layer, and wherein the call management method comprises:
   determining, by the multi-SIM multi-active terminal, call statuses of the multiple user cards according to a connection list in the centralized call management module when a first user card is used for making a call or receiving a call, wherein the connection list is used to record connection data of the multiple user cards; and
   simultaneously setting, by the multi-SIM multi-active terminal, the first user card and a second user card to a conversation state to implement a conference call between the first user card and the second user card when the second user card is in the conversation state,
   wherein the first user card is at least one user card of the multiple user cards, and
   wherein the second user card is at least one user card of the multiple user cards except the first user card.

2. The method according to claim 1, wherein the first user card and the second user card are served by different networks.

3. The method according to claim 1, wherein the first user card and the second user card are served by a same network.

4. The method according to claim 1, wherein the multiple user cards register with a centralized service state management module of the multi-SIM multi-active terminal by using the multiple wireless interface modules respectively, wherein the centralized service state management module is connected to an application layer, and when the first user card is used for receiving a call, before determining the call statuses of the multiple user cards according to the connection list in the centralized call management module, the method further comprises:
   determining, by the multi-SIM multi-active terminal according to a status list in the centralized service state management module, whether the first user card is in a roaming state, wherein the status list is used to record service state data of the multiple user cards;
   determining, by the multi-SIM multi-active terminal, the call statuses of the multiple user cards according to the connection list in the centralized call management module when the first user card is not in a roaming state; or
   terminating, by the multi-SIM multi-active terminal, the call received by using the first user card when the first user card is in a roaming state;
   determining, by the multi-SIM multi-active terminal according to the status list, a user card that is not in a roaming state among the multiple user cards; and
   sending, by the multi-SIM multi-active terminal, a short message service message to a terminal of a calling user, wherein the short message service message carries information about the user card that is not in a roaming state among the multiple user cards to prompt the calling user to make a call to the user card that is not in a roaming state among the multiple user cards.

5. The method according to claim 4, wherein before determining, according to the status list in the centralized service state management module, whether the first user card is in the roaming state, the method further comprises:
   receiving, by the multi-SIM multi-active terminal, a call receiving message, wherein the call receiving message carries a call receiving identifier of the first user card; and
   determining, by the multi-SIM multi-active terminal according to the call receiving identifier of the first user card, that the first user card is used for receiving a call.

6. The method according to claim 1, wherein the multiple user cards register with a centralized service state management module of the multi-SIM multi-active terminal, and when the first user card is used for making a call, before determining the call statuses of the multiple user cards according to the connection list in the centralized call management module, the method further comprises:
   determining, by the multi-SIM multi-active terminal, service quality of the multiple user cards according to a status list in the centralized service state management module; and
   prompting, by the multi-SIM multi-active terminal, a user to select a user card that has the best service quality among the multiple user cards to make a call, or automatically selecting a user card that has the best service quality among the multiple user cards to make a call.

7. The method according to claim 1, wherein the connection data comprises a first identifier of a user card, and wherein the first identifier of the user card is used to identify a user card corresponding to the connection data.

8. The method according to claim 4, wherein the service state data comprises a second identifier of a user card, and wherein the second identifier of the user card is used to identify a user card corresponding to the service state data.

9. A call management method for a multi-subscriber identity module (SIM) multi-active terminal, wherein multiple user cards are installed in the multi-SIM multi-active terminal, wherein the multiple user cards are connected to multiple wireless interface modules in a one-to-one correspondence manner, wherein the multiple user cards register with a centralized call management module of the multi-SIM multi-active terminal by using the multiple wireless interface modules respectively, wherein the centralized call management module is connected to an application layer, and the call management method comprises:
 determining, by the multi-SIM multi-active terminal, call statuses of the multiple user cards according to a connection list in the centralized call management module when a first user card is used for making a call or receiving a call, wherein the connection list is used to record connection data of the multiple user cards; and
 simultaneously setting, by the multi-SIM multi-active terminal, the first user card and a second user card to a conversation state to implement a conrence call between the first user card and the second user card when the second user card is in the conversation state, wherein the first user card is at least one user card of the multiple user cards, and
 wherein the second user card is at least one user card of the multiple user cards except the first user card.

10. The method according to claim 9, wherein the first user card and the second user card are served by different networks.

11. A multi-subscriber identity module (SIM) multi-active terminal, wherein multiple user cards are installed in the multi-SIM multi-active terminal, wherein the multiple user cards are connected to multiple wireless interface modules in a one-to-one correspondence manner, wherein the multiple user cards register with a centralized call. management module of the multi-SIM multi-active terminal by using the multiple wireless interface modules respectively, wherein the centralized call management module is connected to an application layer, and the multi-SIM multi-active terminal comprises:
 a network interface configured to connect to a network and communicate with another device;
 a memory storing instructions; and
 a processor coupled to the memory to execute the instructions to:
  determine call statuses of the multiple user cards according to a connection list inn the centralized call management module when a first user card makes a call or receives a call, wherein the connection list is used to record connection data of the multiple user cards; and
  simultaneously set the first user card and a second user card to a conversation state to implement a conference call between the first user card and the second user card when the second user card is in the conversation state,
  wherein the first user card is at least one user card of the multiple user cards, and
  wherein the second user card is at least one user card of the multiple user cards except the first user card.

12. The multi-SIM multi-active terminal according to claim 11, wherein the first user card and the second user card are served by different networks.

13. The multi-SIM multi-active terminal according to claim 11, wherein the first user card and the second user card are served by a same network.

14. The multi-SIM multi-active terminal according to claim 11, wherein a centralized service state management module of the multi-SIM multi-active terminal performs centralized call management such that the multiple user cards served by different networks can implement the conference call.

15. The multi-SIM multi-active terminal according to claim 11, wherein the multiple user cards register with a centralized service state management module of the multi-SIM multi-active terminal by using the multiple wireless interface modules respectively, wherein the centralized service state management module is connected to an application layer, and the processor coupled to the memory to further execute the instructions to:
 determine, according to a status list in the centralized service state management module, whether the first user card is in a roaming state when the first user card receives a call, before determining the call statuses of the multiple user cards according to the connection list in the centralized call management module, wherein the status list is used to record service state data of the multiple user cards; and
 determine the call statuses of the multiple user cards according to the connection list in the centralized call management module when the first user card is not in a roaming state; or
 terminate the call received by the first fser card when the first user card is in a roaming state;
 determine, according to the status list, a user card that is not in a roaming state among the multiple user cards; and
 send a short message service message to a terminal of a calling user, wherein the short message service message carries information about the user card that is not in a roaming state among the multiple user cards to prompt the calling user to make a call to the user card that is not in a roaming state among the multiple user cards.

16. The multi-SIM multi-active terminal according to claim 15, Wherein the processor coupled to the memory to further execute the instructions to:
 receive a call receiving message before determining, according to the status list in the centralized service state management module, whether the first user card is in a roaming state, wherein the call receiving message carries a call receiving identifier of the first user card; and
 determine, according to the call receiving identifier of the first user card, that the first user card receives a call.

17. The multi-SIM multi-active terminal according to claim 11, wherein the multiple user cards register with a centralized service state management module of the multi-SIM multi-active terminal, and the processor coupled to the memory to further execute the instructions to:
 determine service quality of the multiple user cards according to a status list in the centralized service state management module when the first user card makes a call, before determining the call statuses of the multiple user cards according to the connection list in the centralized call management module; and prompt a user to select a user card that has the best service quality among the multiple user cards to make a call, or automatically select a user card that has the best service quality among the multiple user cards to make a call.

18. The multi-SIM multi-active terminal according to claim 11, wherein the connection data comprises a first identifier of a user card, and wherein the first identifier of the user card is used to identify a user card corresponding to the connection data.

19. The multi-SIM multi-active terminal according to claim 15, wherein the service state data comprises a second identifier of a user card, and wherein the second identifier of the user card is used to identify a user card corresponding to the service state data.

* * * * *

UNITED STATES PATENT AND TRADEMARK OFFICE
CERTIFICATE OF CORRECTION

PATENT NO. : 9,918,219 B2  
APPLICATION NO. : 14/962839  
DATED : March 13, 2018  
INVENTOR(S) : Zixiang Xu and Guangyuan Gao Page 1 of 1

It is certified that error appears in the above-identified patent and that said Letters Patent is hereby corrected as shown below:

Column 21; Line 26, Claim 9 should read:
conversation state to implement a conference call Column 21; Line 54, Claim 11 should read:
according to a connection list in the centralized call Signed and Sealed this
First Day of May, 2018

Andrei Iancu
*Director of the United States Patent and Trademark Office*